(12) United States Patent
O'Brien et al.

(10) Patent No.: US 10,841,217 B2
(45) Date of Patent: Nov. 17, 2020

(54) MULTI-PACKET PROTOCOL HEADER DETECTION

(71) Applicant: Analog Devices Global Unlimited Company, Hamilton (BM)

(72) Inventors: Michael W. O'Brien, Youghal (IE); Sudarshan Onkar, Bengaluru (IN); Joshua J. Nekl, Bandon (IE)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 15/990,193

(22) Filed: May 25, 2018

(65) Prior Publication Data

US 2019/0363981 A1    Nov. 28, 2019

(51) Int. Cl.
*H04L 12/741* (2013.01)
*H04W 4/80* (2018.01)

(52) U.S. Cl.
CPC .............. *H04L 45/74* (2013.01); *H04W 4/80* (2018.02)

(58) Field of Classification Search
CPC ... H04L 45/74; H04L 2012/5674; H04W 4/80
USPC ....................... 370/351, 310, 464
See application file for complete search history.

(56) References Cited

U.S. PATENT DOCUMENTS

| 6,859,899 B2 | 2/2005 | Shalvi et al. |
| 7,577,122 B1 | 8/2009 | Schultz et al. |
| 8,705,418 B1 | 4/2014 | Venugopalan et al. |
| 9,461,654 B1* | 10/2016 | Kou .................. H03L 7/0807 |
| 9,608,905 B1 | 3/2017 | Zhang et al. |
| 9,813,931 B2 | 11/2017 | Makrakis et al. |
| 2008/0069562 A1* | 3/2008 | Ivry ..................... H04J 3/0682 398/52 |
| 2008/0107194 A1 | 5/2008 | Cho et al. |
| 2012/0269301 A1* | 10/2012 | Miyanaga ............ H04B 7/0439 375/340 |
| 2014/0086169 A1* | 3/2014 | Bao ....................... H04W 48/12 370/329 |
| 2015/0365224 A1* | 12/2015 | Waheed ................. H04B 3/542 370/509 |
| 2016/0156750 A1* | 6/2016 | Zhang ..................... H04L 69/22 370/338 |
| 2016/0337219 A1* | 11/2016 | Smith .................. H04L 43/0823 |
| 2018/0263001 A1* | 9/2018 | O'Brien ............... H04B 1/0007 |

FOREIGN PATENT DOCUMENTS

EP    3573307 A1    11/2019

OTHER PUBLICATIONS

Di Jasio, Lucio, "KeeLoq® Manchester Encoding Receive Routines", TB045, Microchip Technologies Inc., DS91045B, 12 pages, dated May 2, 2011. Available at: ww1.microchip.com/downloads/en/AppNotes/91045B.pdf (accessed Jun. 20, 2018).

* cited by examiner

*Primary Examiner* — Jeffrey M Rutkowski
*Assistant Examiner* — Sudesh M Patidar
(74) *Attorney, Agent, or Firm* — Knobbe, Martens, Olson & Bear, LLP

(57) ABSTRACT

Aspects of this disclosure relate to detecting a header of a packet. A receive signal path can provide a receive signal that includes packets and a guard preamble between successive packets of the packets. A receiver control circuit can trigger a timer that sets a time for detecting a header of a packet in response to detecting an end of a preamble of the packet.

20 Claims, 8 Drawing Sheets

MULTI-PACKET PROTOCOL HEADER DETECTION

FIELD OF DISCLOSURE

Embodiments of the present disclosure relate to communications and, in particular, to data communication that involves processing packets.

BACKGROUND

In frequency-shift keying (FSK) systems, digital information can be modulated by dynamically adjusting frequency of carrier. Gaussian frequency-shift keying (GFSK) is an example method of FSK. A receive device can receive an FSK signal that includes packets and process the packets.

The FSK signal can be configured as a multi-packet transmission. The packets can each include a preamble, a synchronization header, and a payload. There are technical challenges associated with detecting the synchronization header in certain applications.

SUMMARY OF THE DISCLOSURE

The innovations described in the claims each have several aspects, no single one of which is solely responsible for its desirable attributes. Without limiting the scope of the claims, some prominent features of this disclosure will now be briefly described.

One aspect of this disclosure is a communication device with multi-packet protocol header detection. The communication device comprises a receive signal path and a receiver control circuit in communication with the receive signal path. The receive signal path is configured to provide a receive signal comprising a multi-packet exchange and a guard preamble between successive packets within the multi-packet exchange. The successive packets include a first packet and a second packet following the first packet. The receiver control circuit is configured to trigger a timer associated with detecting a header of the second packet in response to detecting an end of a preamble of the second packet. The receiver control circuit is configured to detect the header of the second packet.

The timer can have a timeout threshold that is less than a duration of the preamble and the header of the second packet. The timer can have a timeout threshold that is less than or equal to 125% of a duration of the header of the second packet.

The receive signal path can include an analog-to-digital converter and a bit recovery circuit having an input coupled to an output of the analog to digital converter. The bit recovery circuit can generate bits that represent the packets and the guard preamble and to provide the bits to the receiver control circuit.

The receive signal path can be configured to receive and process a frequency shift keying signal. The header can be a synchronization header. The packets and the guard preamble can be in accordance with a multi-packet Bluetooth protocol.

The communication device can include a digital baseband processor configured to demodulate data bits of the second packet in response to the header of the second packet being detected by the receiver control circuit.

The receiver control circuit can include a digital state machine.

Another aspect of this disclosure is a method of detecting a header in a multi-packet bit stream with guard preambles between packets. The method includes receiving a bit stream comprising a multi-packet exchange and a guard preamble between successive packets within the multi-packet exchange. The successive packets include a first packet and a second packet following the first packet. The method includes detecting an end of a preamble of the second packet. The method includes triggering a timer in response to the detecting the end of the preamble of the second packet. The method also includes detecting a header of the second packet before the timer reaches a timeout threshold.

The method can include setting the timeout threshold to a duration that is less than a duration of the preamble and the header of the second packet. The method can include setting the timeout threshold to a duration that is less than or equal to 125% of a duration of the header of the second packet.

The method can include performing automatic frequency correction while the guard preamble is being processed. The method can include demodulating data of the second packet in response to the detecting the header of the second packet. The method can include encountering a failure for the first packet such that the first packet is missed.

Another aspect of this disclosure is a receiver system with multi-packet protocol header detection. The receiver system comprises a receive signal path and a receiver control circuit in communication with the receive signal path. The receive signal path is configured to provide a receive signal comprising packets and a guard preamble between successive packets of the packets. The successive packets comprise a first packet and a second packet following the first packet. The receiver control circuit is configured to trigger a timer for detecting a synchronization header of the second packet, wherein a timeout threshold of the timer corresponds to less than a duration of the preamble and the header of the second packet. The receiver control circuit is configured to detect the synchronization header of the second packet.

The timeout threshold can have a duration that is less than or equal to 125% of a duration of the header of the second packet.

The receive signal path can include a downconverter, an analog-to-digital converter, and a bit recovery circuit having an input coupled to an output of the analog to digital converter. The bit recovery circuit is configured to generate bits that represent the packets and the guard and to provide the bits to the receiver system control circuit.

The receiver control circuit can include a digital state machine. The receiver control circuit can include an automatic gain control circuit configured to provide automatic gain control for the receive signal path. The receiver control circuit can include an automatic frequency correction circuit configured to provide automatic frequency correction for the receive signal path.

The header can be a synchronization header. The packets and the guard preamble can be in accordance with a multi-packet Bluetooth protocol.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION

Figure 1:
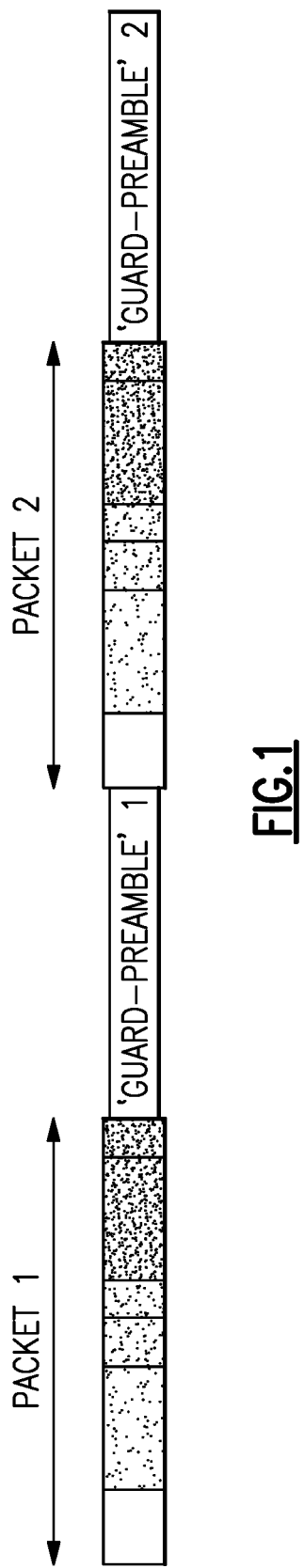
FIG. 1 is a diagram illustrating data of a multi-packet protocol that includes a guard preamble between successive packets.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

Multi-Packet support can be included in various communications protocols, such as Bluetooth Low Energy (BTLE) and BTLE related protocols. Multi-packet protocols can have enhanced data throughput relative to single-packet protocols. For a variety of reasons, a guard-time can be included between adjacent packets, where a link is still transmitting at the link power. A receiver can be powered while the guard preamble is being processed for multi-packet detection protocols. The guard-time can be filled with a guard preamble. This guard-preamble bit stream can include the same pattern of bits as a preamble. For instance, the guard preamble can be a sequence of alternating 0's and 1's.

The duration of the guard preamble may be unconstrained in the protocol. The duration of the guard preamble can be variable. Moreover, prior to processing a multi-packet transmission, the duration of the guard preamble may be unknown to a receiving device arranged to receive and process the multi-packet transmission. Accordingly, the guard preamble can have an indeterminate duration. The indeterminate duration or length can be referred to an undefined length or duration as this length can be unconstrained by a protocol and also unknown to a receiving device prior to processing a multi-packet transmission. The length of different guard preambles can be variable. A receive device can be arranged to process a guard preamble having a variety of different lengths. With unconstrained length guard preambles, different guard preambles can have different durations.

As discussed above, in frequency-shift keying (FSK) systems, digital information can be modulated by dynamically adjusting frequency of carrier. A receive device can receive an FSK signal that includes packets and process the packets. The FSK signal can include multiple packets with a guard preamble between successive packets. The guard preamble can have a length that is undefined by a protocol. The packets can each include a preamble and a synchronization header. There are technical challenged associated with detecting the synchronization header when there is a guard preamble of undefined length between successive packets.

FIG. 1 is a diagram illustrating data of a multi-packet protocol that includes a guard preamble between successive packets. Each packet includes at least a preamble, a synchronization header, and a payload. As shown in FIG. 1, a first guard preamble Guard Preamble 1 is included between a first packet Packet 1 and a second packet Packet 2. Accordingly, the guard preamble is between successive packets, in which the second packet Packet 2 is the next packet following a first packet Packet 1. The first guard preamble Guard Preamble 1 can have a different length than a second guard preamble Guard Preamble 2 in certain applications. Both of the guard preambles can be a sequence of alternating binary values.

In a single packet protocol, the preamble is included to allow time for detecting a signal (e.g., a Gaussian FSK signal), followed by a number of calibrations including, but not limited, to performing automatic gain control (AGC), and performing automatic frequency correction (AFC). Once these operations are completed, a demodulator can hunt for a synchronization header with an associated time-out period. If a synchronization header is not found within the time-out period, then the time-out period expires. A state machine can then re-commence the hunt for the commencement of a packet.

For a multi-packet protocol, it is generally desirable to detect a synchronization header for each packet and maintain a communication link. The synchronization header is typically included in a packet after the preamble. The synchronization header is known between paired communications devices.

A challenge with having an unknown and/or variable guard preamble duration can be setting a synchronization header timeout duration. If the synchronization header timeout duration is set too short, then the synchronization header timeout duration might not extend to the entire duration of the guard-preamble. On the other hand, if the synchronization header timeout duration is set too long, then the recovery time from a false signal detect could result in one or more legitimate packets being missed. False signal detects can be relatively common for BTLE links. It can be desirable to ensure that the recovery from a false signal detect be relatively quick. This can prevent one or more packets from being missed.

Figure 2:
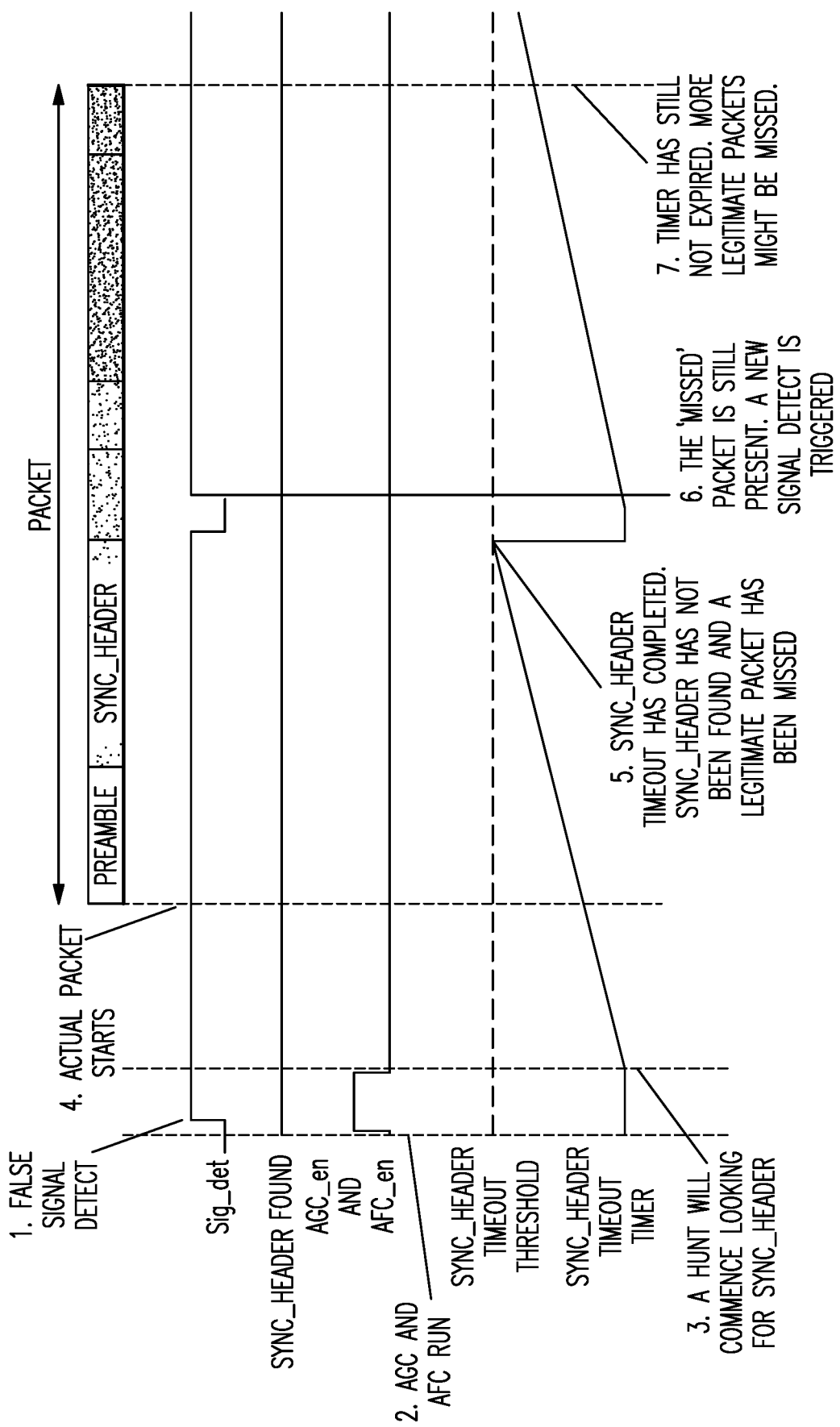
FIG. 2 is a timing diagram associated with detecting a synchronization header in a multi-packet protocol with an unconstrained guard preamble duration.

FIG. 2 is a timing diagram associated with detecting a synchronization header in a multi-packet protocol with an undefined guard preamble duration. A worked example for a problematic case caused by a long synchronization header timeout duration is shown in FIG. 2. In this example, a synchronization header is not found and demodulation of the payload is not commenced. As illustrated, the synchronization header detection signal SYNC_HEADER FOUND is not asserted in FIG. 2.

The example begins with a false signal being detected and a signal detect signal Sig_det being asserted in Event 1. Then AGC and AFC can run while respective enable signals AGC_en and AFC_en are asserted in Event 2. However, AGC and AFC will both likely converge to incorrect values.

With continued reference to FIG. 2, a hunt can commence looking for the synchronization header SYNC_HEADER of the packet in Event 3 after AGC and AFC have been performed. An actual packet can arrive after the hunt is commenced in Event 4. However, processing of the falsely detected packet is not yet complete. The synchronization header timeout can expire while the actual packet is being processed in Event 5. This can occur when the synchronization header timeout SYNC_HEADER Timeout Timer reaches a threshold SYNC_HEADER Timeout Threshold. The synchronization header timeout can have a relatively long duration to accommodate a relatively long guard preamble. The length of the synchronization header timeout in this example can cause legitimate packets to be missed.

The missing packet can still be present when the synchronization header timeout expires in Event 6 as illustrated in FIG. 2. This can cause the signal detect signal Sig_det to be asserted. The synchronization header timeout timer can continue to run for a relatively long time without detecting a synchronization header in Event 7. This can cause more legitimate packets to be missed.

Aspects of this disclosure relate to triggering a synchronization header timeout timer in response to detecting an end of a preamble of a packet and detecting a synchronization header of the packet. Raw bits can be monitored in parallel to detect the end of the preamble and to detect the synchronization header. The synchronization header can be hunted. If the synchronization header is found, then a state-machine can proceed to a subsequent phase of the demodulator. A state-machine can look at the demodulated bits. If the demodulated bits are alternating 0's and 1's, then the assumption is that a preamble, which can be a guard preamble or a preamble of a packet, is present. In response to alternating of 0's and 1's stopping, a synchronization header timeout timer can be triggered. This can accommodate the variability of the guard-preamble duration. As such, a synchronization header timeout threshold can be set to be moderately longer than an expected synchronization header duration. Accordingly, the synchronization header timeout threshold need not be excessively long. The technology described herein can be implemented in any suitable communication device arranged to wireless communicate with another communication device. The communication device can receive a radio frequency signal via a antenna and process the received radio frequency signal.

The synchronization header timeout timer is associated with detecting a synchronization header of a packet. The synchronization header timeout timer can run until a synchronization header is detected or until a synchronization header timeout threshold is reached. The synchronization header timeout threshold can set an amount of time for which a receiver control circuit hunts for a synchronization header. If the synchronization header is not detected within the synchronization header timeout threshold, the synchronization header is not found.

The synchronization header timeout threshold is longer than the duration of the synchronization header. The synchronization header timeout threshold can be shorter than the combined duration of a preamble and a synchronization header of a packet. As one example, a packet can include a preamble of 8 microseconds and a synchronization header of 32 microseconds. In this example, the synchronization header timeout threshold can be less than 40 microseconds (e.g., 38 microseconds) in accordance with the principles and advantages discussed herein. As another example, the synchronization header timeout threshold can have a duration that is less than or equal to 125% of a duration of a synchronization header of a packet. In some instances, the synchronization header timeout threshold can have a duration that is less than or equal to 120% of a duration of a synchronization header of a packet. Advantageously, in these examples, the synchronization header timeout threshold can be relatively short in duration while a receiver system processes a multi-packet transmission that includes a guard preamble between successive packets.

Figure 3:
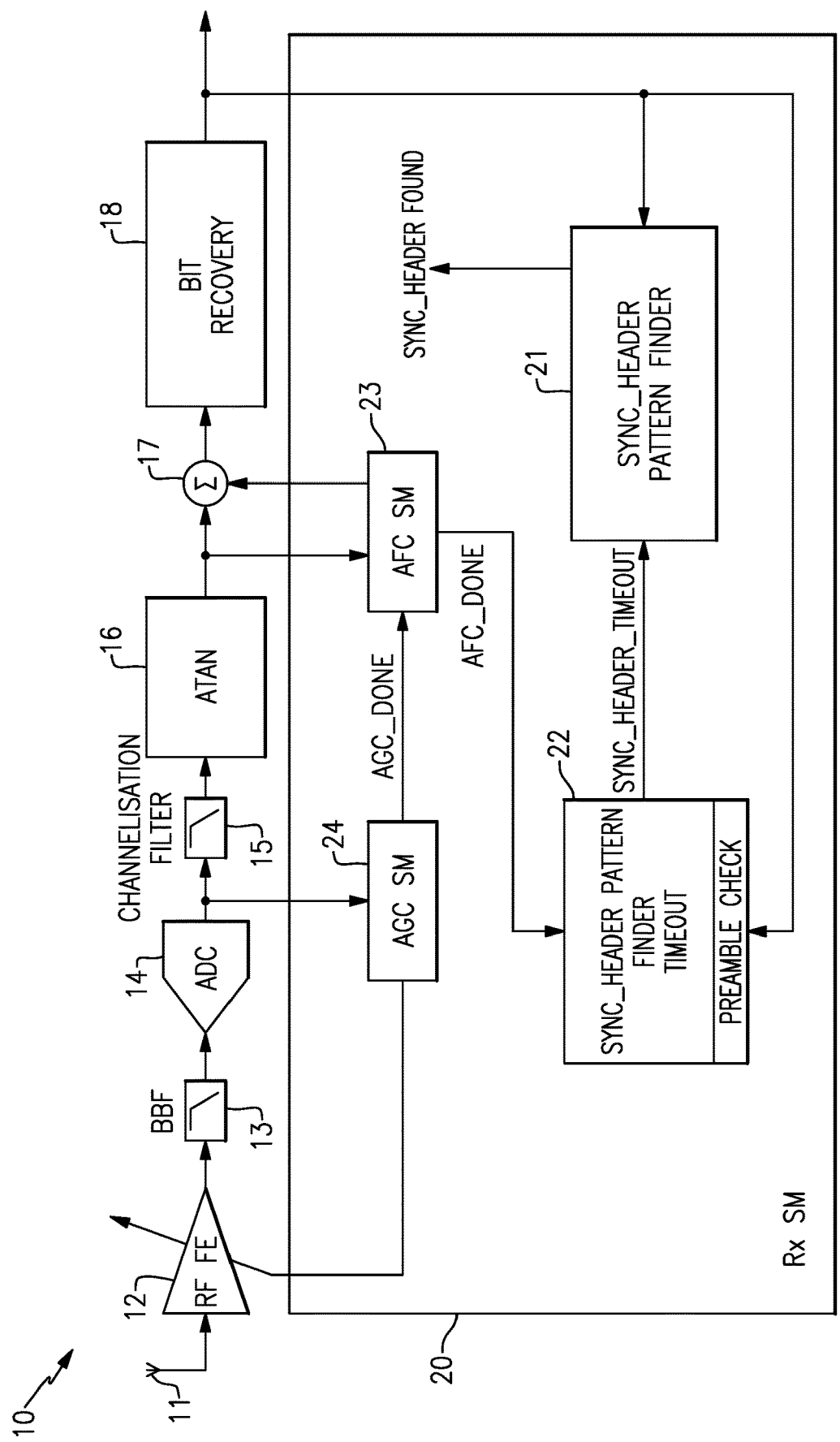
FIG. 3 is a schematic block diagram of a receiver system according to an embodiment.

FIG. 3 is a schematic block diagram of a receiver system 10 according to an embodiment. As illustrated, the receiver system 10 includes an antenna 11, a radio frequency front end (RF FE) 12, a baseband filter 13, an analog-to-digital converter (ADC) 14, a channelization filter 15, a frequency conversion circuit 16, an adjustment circuit 17, a bit recovery circuit 18, and a receiver control circuit 20. The receiver control circuit 20 can include a synchronization header detection circuit 21, a synchronization timer and preamble detection circuit 22, an automatic frequency control circuit 23, and an automatic gain control circuit 24. The receiver control circuit 20 can be a state machine. Some or all of the functionality of the receiver control circuit 20 can be implemented by digital circuitry.

The antenna 11 can receive a radio frequency signal from a transmit device. The radio frequency signal can be an FSK signal, such as a GFSK signal. The FSK signal can be in accordance with a Bluetooth protocol, such as BTLE 4 or BLTE 5. The antenna 11 can be implemented external to an integrated circuit that includes the other illustrated circuitry of the receiver. The antenna 11 can be connected to the RF FE 12 by way of an integrated circuit contact. The RF FE 12 can process the radio frequency signal. For instance, the RF FE 12 can include a low noise amplifier and one or more filters. The RF FE 12 can downconvert the processed RF signal to baseband. The RF FE 12 can output an in-phase signal (I signal) and a quadrature signal (Q signal) that is 90° out of phase with the I signal Although a single receive signal path from the RF FE 12 is shown in FIG. 2, both an I signal and a Q signal from the RF FE 12 can be similarly processed.

The baseband filter 13 can filter an output signal of the RF FE 12. The ADC 14 can convert an output signal provided by the baseband filter 13 to a digital signal. The channelization filter 15 can filter an output of the ADC 14. The output of the channelization filter 15 is connected to the frequency conversion circuit 16. While only one signal path from the RF FE 12 to the frequency conversion circuit 16 is shown in FIG. 3, an I path and a Q path can be included between the RF FE 12 and the frequency conversion circuit 16.

The frequency conversion circuit 16 can perform an arctangent (ATAN) function. This can convert an IQ signal to a phase. The frequency conversion circuit 16 can perform an additional function, such as a differential function, to convert the phase to frequency. The frequency conversion circuit 16 can convert processed I and Q signals to a frequency. Any suitable circuit that convert I and Q signals to a frequency can be implemented by the frequency conversion circuit 16.

The adjustment circuit 17 can adjust an output signal from the frequency conversion circuit 16 using a frequency correction signal provided by the automatic frequency correction circuit 23. This can correct for a frequency offset in a FSK signal received by the receiver system 10. The adjustment circuit 17 can be a summer as illustrated. The adjustment circuit 17 can perform any suitable operation (for example, addition, subtraction, the like, or any suitable combination thereof) to adjust an output signal from the frequency conversion circuit 16 based on the frequency correction signal from the automatic frequency correction circuit 23. For instance, the adjustment circuit 17 can subtract a frequency correction value from the output of the frequency conversion circuit 16. The frequency correction signal can be determined while a guard preamble between successive packets is being processed. The frequency correction signal can be set for the duration a packet.

A frequency corrected signal provided by the adjustment circuit 17 can be further processed. The frequency corrected signal can be provided to the bit recovery circuit 18 that generates bits corresponding to the FSK signal received by the antenna 11.

A bit stream from the bit recovery circuit 18 can be provided to the synchronization header detection circuit 21. The synchronization header detection circuit 21 can search for a synchronization header. The synchronization header can be detected when a pattern in the bit stream matches the synchronization header. The synchronization header can be predefined, for example, by a communications protocol. Although embodiments discussed herein relate to synchronization headers, any suitable principles and advantages discussed herein can be applied to detecting any suitable header of a packet.

The bit stream from the bit recovery circuit 18 can also be provided to the synchronization timer and preamble detection circuit 22. The synchronization timer and preamble detection circuit 22 can detect an end of a preamble of a packet. For example, the end of the preamble of the packet can be detected when two bits of the bit stream have the same value following a sequence of alternating 0's and 1's. Accordingly, the end of the preamble can be detected based on one or more bits that follow the preamble in the packet. The one or more bits can be part of a synchronization header. Accordingly, the end of the preamble of the packet can be detected in parallel with the synchronization header detection circuit 21 hunting for the synchronization header. In some other applications, the synchronization header can be detected after the preamble is detected by detecting less than the entire synchronization header (e.g., 1 bit less than the full synchronization header or 2 bits less than the full synchronization header).

In a BTLE system, the preamble can be either 0101 . . . 01 or 1010 . . . 10. The preamble that is used can depend on the first bit of the synchronization header. If the first bit of the synchronization header is 0, then the preamble can be 0101 . . . 01. If the first bit of the synchronization header is 1 then the preamble can be 1010 . . . 10. Accordingly, there can be either a 01 or 10 transition going from the preamble to the synchronization header. As such, the expiration time can be 2 bits less than the full synchronization header and still detect the synchronization header.

The synchronization timer and preamble detection circuit 22 can receive an AFC completion signal AFC done from the AFC circuit 23. In response to AFC being completed and the end of a preamble being detected, the synchronization timer and preamble detection circuit 22 can start the synchronization header timeout timer. The synchronization timer and preamble detection circuit 22 can provide the synchronization timer timeout signal SYNC_HEADER_TIMEOUT to the synchronization header detection circuit 21 to start the synchronization header timer. The synchronization header detection circuit 21 can assert a synchronization header detection signal SYNC_HEADER FOUND in response to detecting the synchronization header of the packet. This can cause a baseband processor to demodulate a payload of the packet. Although embodiments discussed herein relate to synchronization header timers, any suitable principles and advantages discussed herein can be applied to any suitable timer that sets a time for detecting a header of a packet.

The AFC circuit 23 can detect a frequency based on an instantaneous frequency contained in the guard preamble. The AFC circuit 23 can include a state machine. The AFC circuit 23 can generate frequency correction signal and provide the frequency correction signal to the adjustment circuit 17. The frequency correction signal can be determined while the guard preamble between successive packets is being processed by the receiver system 10. The frequency correction signal can be set for the duration of the packet.

The automatic gain control circuit 24 can receive a digital signal from the ADC 14 and adjust a gain of the RF FE 12 based on the digital signal. These operations can be performed while the guard preamble is being processed by the receiver system 10. The automatic gain control circuit 24 can be implemented by a state machine. The automatic gain control circuit 24 can send an automatic gain control completion signal ADG_done to the automatic frequency correction circuit 23.

Figure 4:
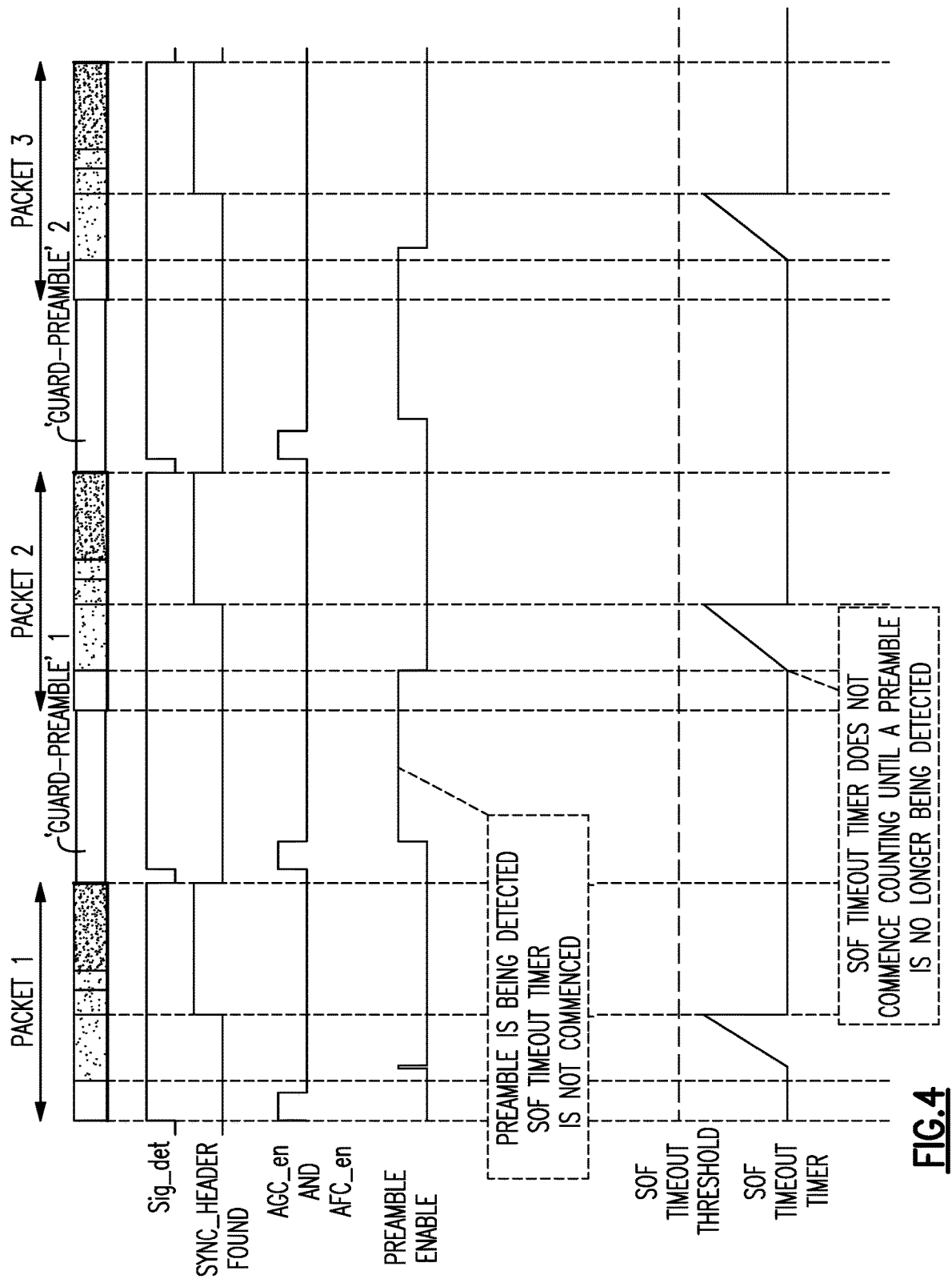
FIG. 4 is a timing diagram associated with receiving multiple packets for a functional case in the receiver system of FIG. 3.

FIG. 4 is a timing diagram associated with receiving multiple packets for a functional case in the receiver system 10 of FIG. 3. FIG. 4 illustrates timing of signals in the receiver control circuit 20 for receiving 3 packets. This timing diagram illustrates how the receiver system 10 of FIG. 3 can process multiple packets with a relatively short synchronization header timer.

The first packet Packet 1 is detected. This causes the signal detect signal Sig_det to be asserted. AGC and AFC operations of the automatic frequency control circuit 23 and an automatic gain control circuit 24, respectively, are enabled in the receiver control circuit 20, as indicated by their respective control signals AGC_en and AFC_en being asserted. A preamble enable signal within the receiver control circuit 20 is asserted in response to the preamble being detected. The preamble can be detected by detecting an alternating sequence of 1's and 0's of a sufficient length. The preamble enable signal is de-asserted in response to an end of the preamble being detected. The synchronization header timeout timer SOF Timeout Timer is triggered in response the end of the preamble being detected. A Start of Frame flag (SOF) indicates whether a synchronization header has been found. For example, the SOF can correspond to the synchronization header detection signal SYNC_HEADER FOUND.

With continued reference to FIG. 4, the synchronization header is found by the receiver control circuit 20 before the synchronization header timeout timer SOF Timeout Timer reaches the SFO Timeout Threshold. Accordingly, the synchronization header for the first packet Packet 1 is found within the synchronization header timeout time and demodulation of the data of the packet can commence. Demodulation can commence in response to the the synchronization header detection signal SYNC_HEADER FOUND being asserted. The synchronization header detection signal SYNC_HEADER FOUND can be de-asserted at the end of the first packet Packet 1 as shown by the timing diagram of FIG. 4.

The signal detection signal Sig_det is asserted while the guard preamble is being processed. AGC and AFC are then enabled by the respective control signals AGC_en and AFC_en being asserted. The preamble enable is then asserted while the guard preamble is being processed. The synchronization header time is not asserted until the preamble enable signal is de-asserted. In response to the receiver control circuit 20 detecting the end of the preamble, the synchronization header timeout timer SOF Timeout Timer is triggered. The synchronization header is detected for the second packet Packet 2 before the synchronization timer reaches a timeout threshold. The data of the second packet Packet 2 commences in response to the synchronization header being found.

The receiver control circuit 20 can process the third packet Packet 3 similarly to the second packet Packet 2.

Figure 5:
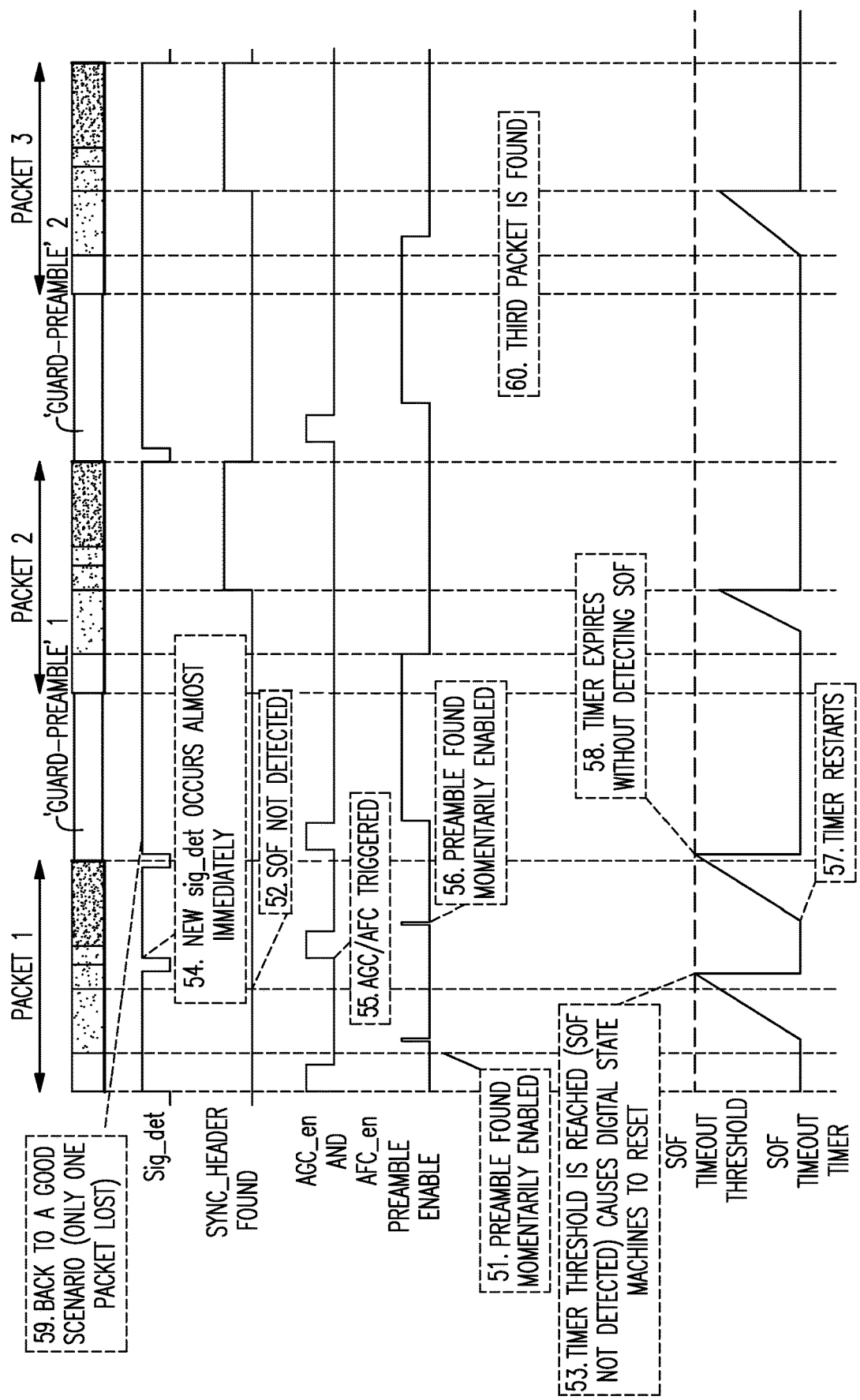
FIG. 5 is a timing diagram associated with receiving multiple packets for a failing case in the receiver system of FIG. 3.

FIG. 5 is a timing diagram associated with receiving multiple packets for a failing case in the receiver system 10 of FIG. 3. FIG. 5 illustrates timing of signals in the receiver control circuit 20 for receiving 3 packets in which there is a synchronization failure on the first packet. This timing diagram illustrates how the receiver system 10 of FIG. 3 can recover relatively quickly from a synchronization error failure and properly detect the next packet.

A preamble enable signal is asserted for a relatively short time in Event 51. The synchronization header is not detected by the time that the synchronization header is finished being processed. Accordingly, the first packet Packet 1 will be lost. The synchronization header timer timeout threshold is reached in Event 52. Accordingly, the SOF is not detected, which corresponds to an error scenario. This can cause digital state machines of the receiver control circuit 20 to reset in Event 53. The signal detect signal Sig_det can be asserted again relatively soon in Event 54, as a packet is still being received. AGC and AFC can be triggered again in Event 55. The preamble is then found again in Event 56 while the first packet Packet 1 is being received. The synchronization header timer is started again in Event 57 while the first packet Packet 1 is being received. The timer expires without the synchronization header being detected in Event 58.

The signal detect signal Sig_det is asserted again in Event 59 while the first guard preamble Guard Preamble 1 is being processed. The second packet Packet 2 is processed like the second packet of FIG. 4. The third packet Packet 3 is processed in Event 60 like the third packet of FIG. 4. Accordingly, only one packet is lost in the error case where there is a synchronization failure on the first packet in the worked case of FIG. 5.

In the FIG. 5, a worked example is given for the recovery case where there is a synchronization failure in the first packet of a multi-packet transmission. However, the receiver systems in accordance with the principles and advantages discussed herein can recover from a variety of different recoverable failure cases.

Other recoverable failure cases include a variety of failure scenarios in a first packet, any type of failure in a second or subsequent packet, false signal detects, and the like. Failure scenarios on the first packet include late signal-detection, AGC errors, AFC measurement and/or correction errors, and the like. For these cases, the first packet will likely be missed, but all subsequent packets can be recoverable. Such recoveries can be similar to the recovery described with reference to FIG. 5. For failures in a second or subsequent packet, the failed packet will likely be lost, but all other packets can be recoverable. Using the technology described herein, a relatively quick decision can be made on whether the signal detect signal was false and the receiver state machine can speedily prepare and wait for the next signal detect event. This can provide a speedy recovery from false signal detects.

Figure 6:
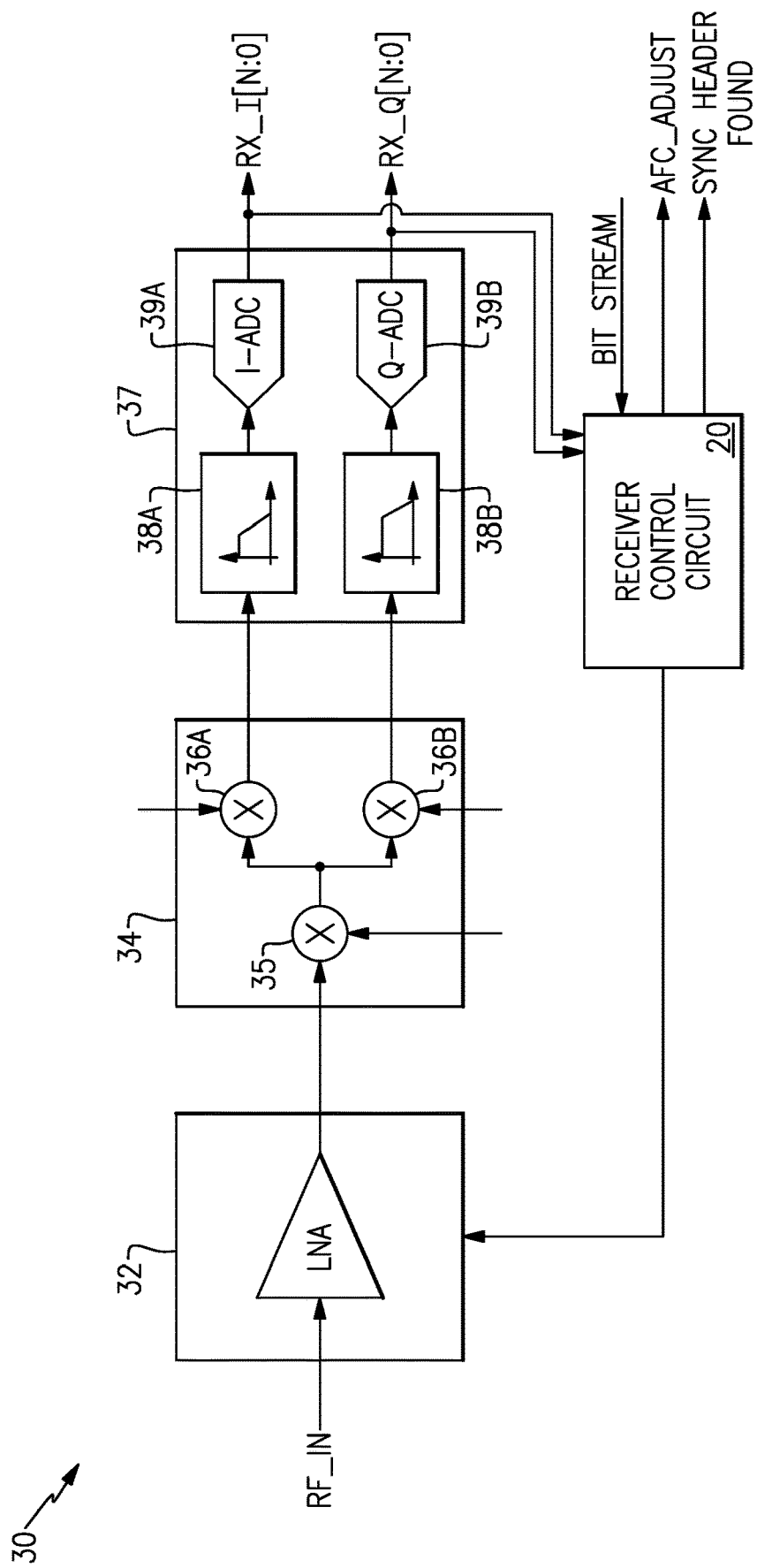
FIG. 6 is a schematic diagram of a receive signal chain according to an embodiment.

FIG. 6 is a schematic diagram of a receive signal chain 30 according to an embodiment. As illustrated, the receive signal chain 30 includes a low noise amplifier (LNA) 32, a down converter 34, and a filtering and data conversion circuit 37. The receive signal chain 30 is in communication with a receiver control circuit 20.

The down converter 34 can be a heterodyne downconverter. The illustrated downconverter 34 includes mixers 35, 36A, and 36B. The down converter 34 can frequency translate the output signal from the LNA 32 from a radio frequency signal to quadrature base-band signals. The first down conversion stage of the down converter 34 includes the mixer 35 that can generate an intermediate frequency signal from the radio frequency signal from the LNA 32. Image rejection can be provided via a combination of the band-pass transfer function of the LNA 32, and its input matching circuit. The second down-conversion stage of the down converter 34 includes mixers 36A and 36B that can perform a complex mix that results in quadrature I and Q base band output signals.

The I and Q baseband signals can subsequently be filtered and then digitized by the filtering and data conversion circuit 37. Baseband filters 38A and 38B can filter I and Q baseband signals, respectively. The filtered baseband signals can be converted to digital signals RX_I[N:0] and RX_Q[N:0] by the ADCs 39A and 39B, respectively. The ADC output signals can be provided to a digital baseband processor for demodulation.

The receiver control circuit 20 can be implemented in accordance with any suitable principles and advantages of the receiver control circuits discussed herein. The receiver control circuit 20 can receive a bit stream BIT STREAM and detect a synchronization header and an end of a preamble in the bit stream BIT STREAM. The receiver control circuit 20 can provide a synchronization header detection signal SYNC_HEADER FOUND that indicates whether a synchronization header of a packet is detected. The ADC output signals can be provided to the receiver control circuit 20. The ADC output signals can be used in AFC. The receiver control circuit 20 can provide and AFC adjustment signal ADF_ADJUST. The receiver control circuit 20 can provide a control signal to the LNA 32 to implement AGC.

Figure 7:
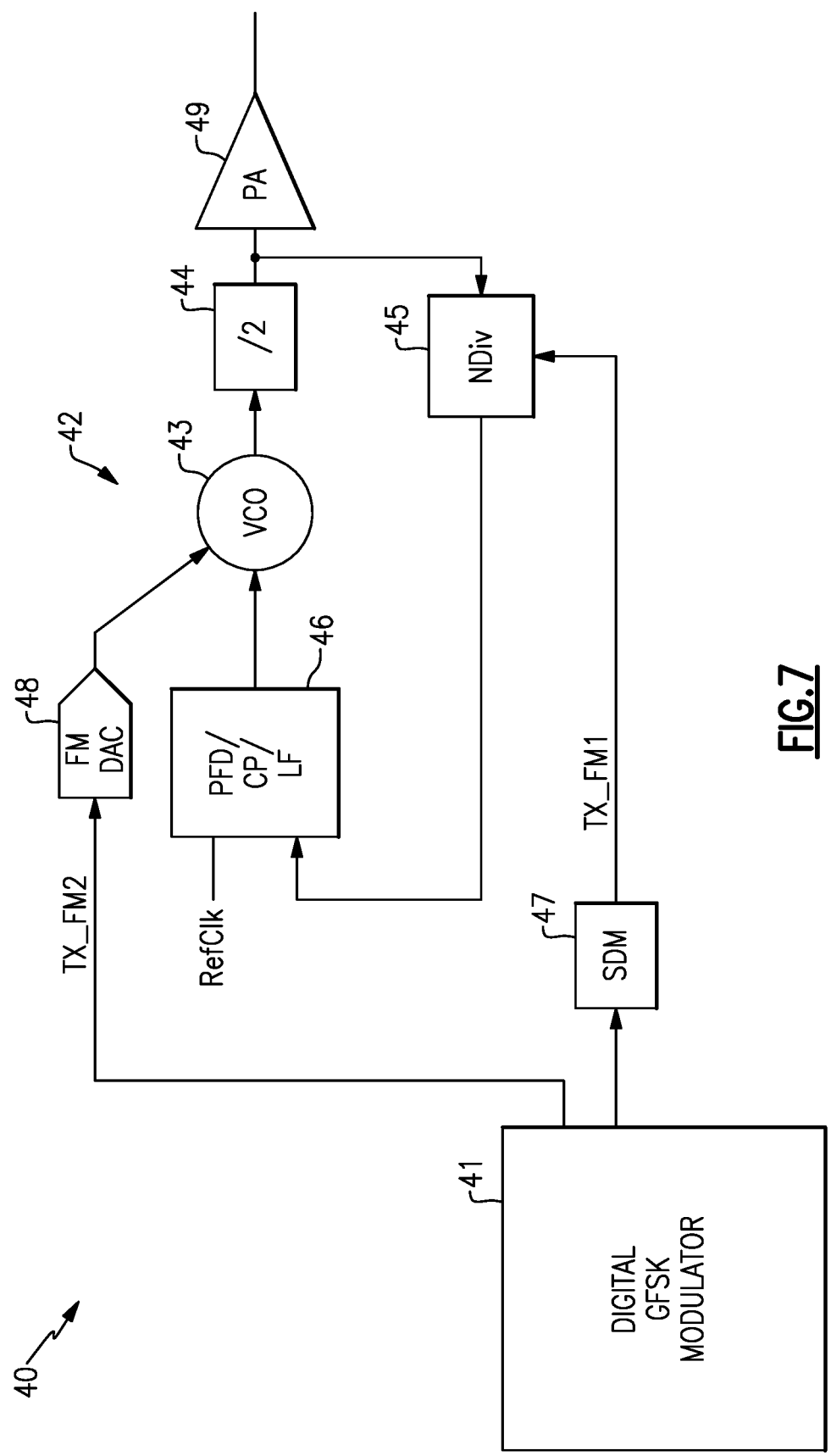
FIG. 7 is a schematic diagram of a transmit signal chain for generating a radio frequency signal to be received by any suitable receiver discussed herein

FIG. 7 is a schematic diagram of a transmit signal chain 40 for generating a radio frequency signal to be received by any suitable receiver discussed herein. The transmit signal chain 40 can have enhanced flexibility in generating a multi-packet transmission with guard preambles between successive packets for communicating with receivers discussed herein. For instance, the transmit signal chain 40 can generate a multi-packet transmission in which the guard preamble can have a length that is unknown to a paired receiving device prior to processing the multi-packet transmission. In some instances, a transceiver device includes the transmit signal chain 40 and a receiver implemented in accordance with any suitable principles and advantages discussed herein. In the transmit signal chain 40, the transmitter takes on the form of a frequency synthesizer with digital control ports allowing instantaneous frequency modulation. Frequency control words can be received from a digital baseband processor. Carrier frequency adjustment and modulation are performed via the frequency synthesizer. Output signal generation and power control can be performed via the power amplifier.

The illustrated transmit signal chain 40 includes a digital Gaussian frequency-shift keying (GFSK) modulator 41, a phase-locked loop (PLL) 42, and a power amplifier 49. The PLL 42 is a frequency synthesizer. The PLL 42 includes a voltage-controller oscillator 43, a divider 44, a feedback divider 45, and a phase frequency detector/charge pump/loop filter circuit 46.

Carrier frequency adjustment and low frequency modulation can be accomplished using a first control word TX_FM1. A sigma delta modulator 47 can generate the first control word TX_FM1 based on an output of the GFSK modulator 41. The first control word TX_FM1 can dynamically adjust a division ratio in a feedback loop of the PLL 42. In particular, the first control word TX_FM1 can adjust a division ratio of the feedback divider 45. The transfer function of the frequency modulation at this injection point can take on a low-pass form, with the bandwidth being defined by the PLL's loop bandwidth.

A digital-to-analog converter (DAC), such as a frequency modulated (FM) DAC 48, can modulate the PLL's carrier frequency via a second control word TX_FM2 to provide for high frequency modulation. The FM DAC 48 can convert the second control word TX_FM2 to an analog signal and apply the analog signal to the voltage-controlled oscillator 43 of the PLL 42. The transfer function of this injection point can take on a high-pass form, with the cut-off determined by the PLL's loop bandwidth.

The GFSK modulator 41 can modulate a bit stream, including the associated packet handling, for transmission by the transmit signal chain 40. The GFSK modulator 41 can include a Gaussian filter.

The power amplifier 49 can include multiple portions, each converting the PLL's output voltage waveform to a current. The output power of the power amplifier 49 can be set by adjusting the number of active power amplifier portions. An output matching circuit (not illustrated) can be coupled between an output of the power amplifier and an antenna.

Figure 8:
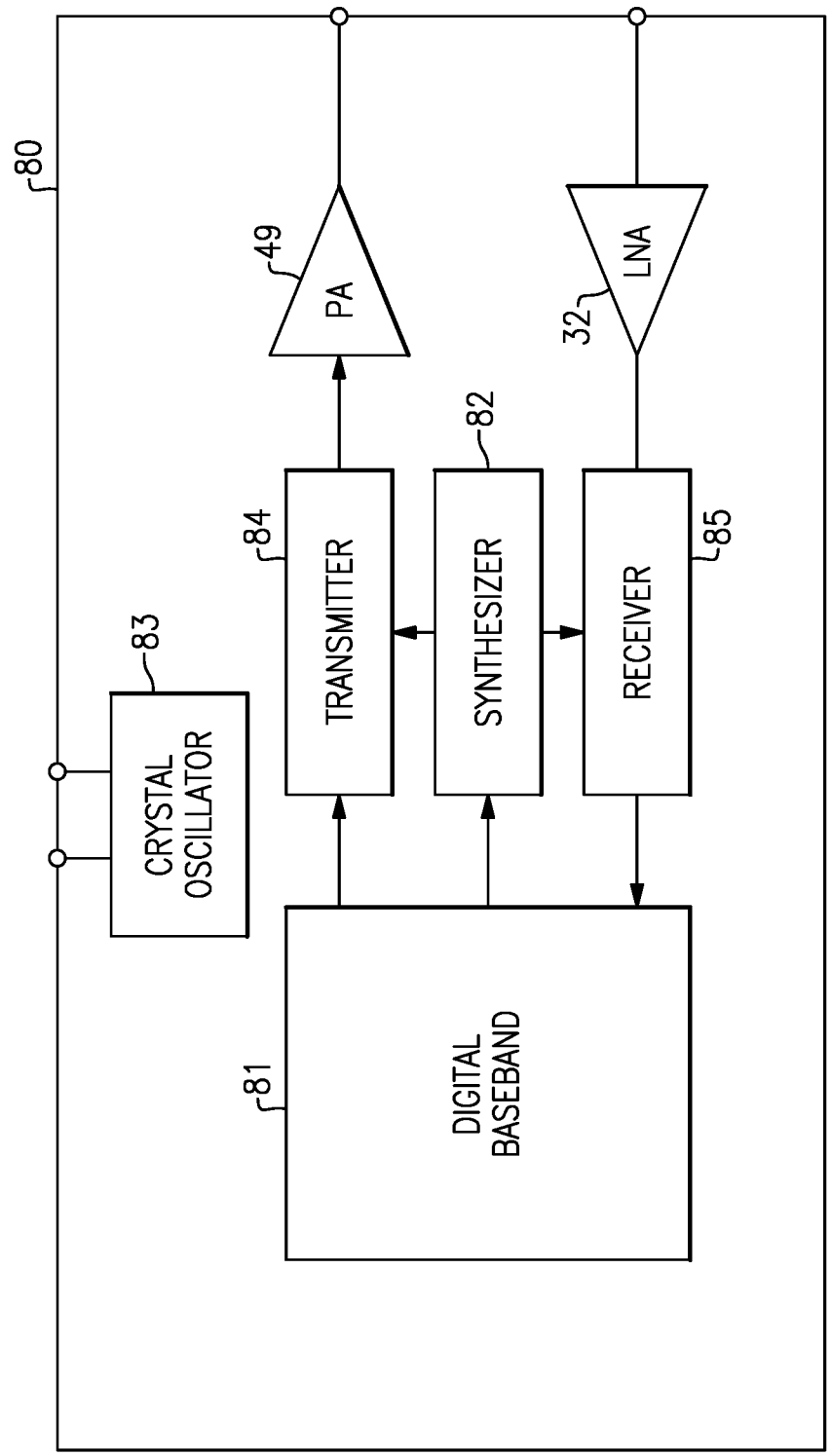
FIG. 8 is a schematic diagram of a transceiver integrated circuit according to an embodiment.

FIG. 8 is a schematic diagram of a transceiver integrated circuit 80 according to an embodiment. Any of the transmit devices and/or the receive devices discussed herein can be implemented on a transceiver integrated circuit. As illustrated, the transceiver integrated circuit 80 includes a digital baseband processor 81, a synthesizer 82, a crystal oscillator 83, a transmitter 84, a power amplifier 49, a receiver 85, and a low noise amplifier 32.

An analog RF FE can include the transmitter 84, the receiver 85, and the synthesizer 82. The transceiver 80 can operate in a half-duplex fashion so that the synthesizer 82 can serve the dual purpose of generating local oscillator signals for both the receiver 85 and the transmitter 84. In the transceiver integrated circuit 80, a receive chain can include the low noise amplifier 32, a receiver 85 that includes a heterodyne down-converter and filtering, and a data conversion stage in the baseband processor 81. In the transceiver integrated circuit 80, a transmitter chain can include a transmitter 84 that includes a frequency agile synthesizer and the power amplifier 49. The transmitter chain of the integrated circuit 80 can include any suitable features of the transmit signal chain 40 of FIG. 7. In the transceiver integrated circuit 80, a receive chain can include a receiver 85 and the low noise amplifier 32. The receiver chain of the integrated circuit 80 can include any suitable features of the receive signal chain 30 of FIG. 6 and/or any suitable features of the receiver system 10 of FIG. 3. The receiver 85 can receive a FSK signal that includes a multiple packets with a guard preamble of indeterminate length between successive packets in accordance with any suitable principles and advantages discussed herein. The illustrated crystal oscillator 83 is connected to an off-chip crystal. The radio channel frequency and symbol rate can be derived from an output of the crystal oscillator 83.

The digital baseband processor 81 can perform any suitable processing associated with generating signals for the transmitter 84 and/or processing signals provided by the receiver 85. The receiver 85 and/or the digital baseband processor 81 can implement synchronization header detection and/or multi-packet protocol processing in accordance with any suitable principles and advantages discussed herein. The receiver control circuit 20 can be included in the receiver 85 and/or the digital baseband processor 85. The digital baseband processor 81 can provide digital modulation data to the transmitter 84. The digital baseband processor 81 can include any of the modulation circuits discussed herein, such as the digital GFSK modulator 41 of FIG. 7. The digital baseband processor 81 can process baseband data from the receiver 85 to perform a variety of different processing, such as synchronization, and data demodulation. The digital baseband processor 81 can demodulate data bits of a packet in response to the header of the second packet being detected by a receiver control circuit. The digital baseband processor 81 can dynamically provide configuration and/or control data to/from an RF FE that includes the transmitter 84 and the receiver 85. The digital baseband processor 81 can control system timing in the transceiver integrated circuit 80.

Any of the principles and advantages discussed herein can be applied to other systems, devices, integrated circuits, electronic apparatus, not just to the embodiments described above. The elements and operations of the various embodiments described above can be combined to provide further embodiments. The principles and advantages of the embodiments can be used in connection with any other systems, devices, integrated circuits, apparatus, or methods that could benefit from any of the teachings herein. The technology described herein can be implemented in any suitable wireless communication device configured to receive and process an FSK signal, such as a wireless device configured to receive signals in accordance with the Bluetooth protocol.

Aspects of this disclosure can be implemented in various electronic devices. Examples of the electronic devices can include, but are not limited to, consumer electronic products, parts of electronic products such as integrated circuits, electronic test equipment, wireless communication devices, personal area network communication devices, cellular communications infrastructure such as a base station, vehicular electronics such as automotive electronics, etc. Further, the electronic devices can include unfinished products.

Unless the context indicates otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel methods, apparatus, systems, devices, and integrate circuits described herein may be embodied in a variety of other forms; furthermore, various omissions, substitutions and changes in the form of the methods, apparatus, and systems described herein may be made without departing from the spirit of the disclosure. For example, circuit blocks described herein may be deleted, moved, added, subdivided, combined, and/or modified. Each of these circuit blocks may be implemented in a variety of different ways. The accompanying claims and their equivalents are intended to cover any such forms or modifications as would fall within the scope and spirit of the disclosure.

What is claimed is:

1. A communication device with multi-packet protocol header detection, the communication device comprising:
   a receive signal path configured to provide a receive signal comprising packets and guard preambles between successive packets of the packets, the successive packets comprising a first packet and a second packet following the first packet, the first packet comprising a first payload, the second packet comprising a preamble and a header and a second payload, and the guard preambles comprising (i) a first guard preamble between the first payload and the preamble and (ii) a second guard preamble following the second payload, wherein the first guard preamble has a different duration than the second guard preamble, and wherein the first guard preamble comprises a same bit pattern as the preamble; and
   a receiver control circuit in communication with the receive signal path, the receiver control circuit configured to:
      trigger a timer associated with detecting the header of the second packet in response to detecting an end of the preamble of the second packet; and
      detect the header of the second packet.

2. The communication device of claim 1, wherein the timer has a timeout threshold that is less than a duration of the preamble and the header of the second packet.

3. The communication device of claim 1, wherein the timer has a timeout threshold that is less than or equal to 125% of a duration of the header of the second packet.

4. The communication device of claim 1, wherein the receive signal path comprises an analog-to-digital converter and a bit recovery circuit having an input coupled to an output of the analog-to-digital converter, the bit recovery circuit configured to generate bits that represent the packets and the guard preambles and to provide the bits to the receiver control circuit.

5. The communication device of claim 1, further comprising a digital baseband processor configured to demodulate data bits of the second packet in response to the header of the second packet being detected by the receiver control circuit.

6. The communication device of claim 1, wherein the receiver control circuit comprises a digital state machine.

7. The communication device of claim 1, wherein the receive signal path is configured to receive and process a frequency shift keying signal.

8. The communication device of claim 1, wherein the header of the second packet is a synchronization header, and the packets and the guard preambles are in accordance with a multi-packet Bluetooth protocol.

9. A method of detecting a header in a multi-packet bit stream with guard preambles between packets, the method comprising:
   receiving a bit stream comprising packets and guard preambles between successive packets of the packets, the successive packets comprising a first packet and a second packet following the first packet, the first packet comprising a first payload, the second packet comprising a preamble and a header and a second payload, and the guard preambles comprising (i) a first guard preamble between the first payload and the preamble and (ii) a second guard preamble following the second payload, wherein the first guard preamble has a different duration than the second guard preamble;
   detecting an end of the preamble of the second packet;
   triggering a timer in response to the detecting the end of the preamble of the second packet; and
   detecting the header of the second packet before the timer reaches a timeout threshold.

10. The method of claim 9, further comprising setting the timeout threshold to a duration that is less than a duration of the preamble and the header of the second packet.

11. The method of claim 9, further comprising setting the timeout threshold to a duration that is less than or equal to 125% of a duration of the header of the second packet.

12. The method of claim 9, further comprising demodulating data of the second packet in response to the detecting the header of the second packet.

13. The method of claim 9, wherein the first guard preamble comprises a same bit pattern as the preamble.

14. The method of claim 9, further comprising performing automatic frequency correction while the guard preambles are being processed.

15. A receiver system with multi-packet protocol header detection, the receiver system comprising:
   a receive signal path configured to provide a receive signal comprising:
      a first packet comprising a first payload,
      a first guard preamble following the first payload,
      a second packet following the first guard preamble and separated from the first packet by the first guard preamble, the second packet comprising a preamble, a synchronization header, and a second payload, and
      a second guard preamble following the second payload;
      wherein the first guard preamble has a different duration than the second guard preamble; and
   a receiver control circuit in communication with the receive signal path, the receiver control circuit configured to:

trigger a timer for detecting the synchronization header of the second packet in response to detecting an end of the preamble of the second packet, wherein a timeout threshold of the timer corresponds to less than a duration of the preamble and the synchronization header of the second packet; and detect the synchronization header of the second packet.

16. The receiver system of claim 15, wherein the timeout threshold has a duration that is less than or equal to 125% of a duration of the synchronization header of the second packet.

17. The receiver system of claim 15, wherein the receive signal path further comprises:

a downconverter;

an analog-to-digital converter; and a bit recovery circuit having an input coupled to an output of the analog-to-digital converter, the bit recovery circuit configured to generate bits that represent the first and second packets and the first and second guard preambles and to provide the bits to the receiver system control circuit.

18. The receiver system of claim 15, wherein the receiver control circuit comprises a digital state machine.

19. The receiver system of claim 15, wherein the receiver control circuit further comprises:

an automatic gain control circuit configured to provide automatic gain control for the receive signal path; and an automatic frequency correction circuit configured to provide automatic frequency correction for the receive signal path.

20. The receiver system of claim 15, wherein the first and second packets and the first and second guard preambles are in accordance with a multi-packet Bluetooth protocol.

* * * * *